Nov. 3, 1936.  M. T. THORSSON  2,059,761

TESTING MACHINE

Filed July 28, 1934

INVENTOR
Matthew T. Thorsson
BY
A. C. Maby
ATTORNEY

Patented Nov. 3, 1936

2,059,761

UNITED STATES PATENT OFFICE 2,059,761

TESTING MACHINE

Matthew T. Thorsson, East Williston Park, Long Island, N. Y., assignor to International Business Machines Corporation, New York, N. Y., a corporation of New York Application July 28, 1934, Serial No. 737,322

18 Claims. (Cl. 265—15)

This case relates to testing machines for testing material such as wires, rods, or the like.

The object of the invention is to provide testing means for material which will automatically indicate the applied force during the test and maintain an indication of the force required to rupture the material.

Further, this object contemplates the provision of a weighing machine to indicate the variable applied testing forces and maintain an indication of the force which ruptures the material after the latter has been ruptured.

Another object is to provide means for applying the testing forces operable only when the material is in position to be tested.

The latter object is further to provide an electrical control for the force applying means and still further to provide automatic force applying means, which, if desired, may be manually interrupted.

Still another object is to provide a shot reservoir from which shot are transferred to a receiver through which the testing load is applied to the material.

An additional object is to provide a novel gage for indicating the elongation of the material during the testing operation.

Other objects and advantages will be understood from the following parts of the specification and from the drawing, wherein.

Figures 1, 2, 3:
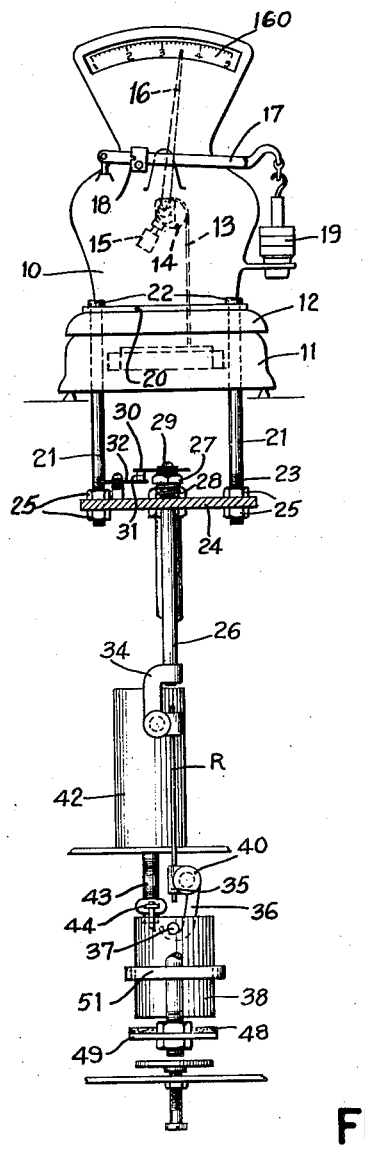
Fig. 1 is a front view of the testing machine.
Fig. 2 is a side view thereof.
Fig. 3 is a circuit diagram.

In detail, the machine comprises a weighing scale unit which includes a frame 10 having a base housing 11. Within the base is any suitable base lever system for carrying the platform 12 and connected to the tape 13 secured to the periphery of a cam 14 rigidly carrying a pendulum counterbalance 15 and a pointer 16. A tare beam 17 with poise 18 and counterweights 19 is also provided. Such a scale is fully disclosed in Patent No. 1,455,411.

The top of platform 12 carries a flat plate 20 and both the platform and plate 20 are bored at each corner to receive four vertical rods 21, terminating at the upper end in screw heads 22 which abut the top of plate 20 and at their lower ends in threaded portions 23. A plate 24 forming a sub-platform is secured to threaded portions 23 and held in adjustable position by nuts 25 at opposite sides of the sub-platform. Through the center of sub-platform 24 is passed a rod 26 threaded at the upper end to adjustably receive a nut 27 between which and plate 24 is located a short coil spring 28 normally holding the rod 26 in uppermost position. The top of nut 27 carries a terminal 29 conductively connected to a spring blade 30 provided with one of the coacting contact points 31, the other of which is on a spring blade 32 carried by sub-platform 24.

The lower end of rod 26 is provided with a clamp 34 to releasably receive and clamp the upper end of the rod or wire R to be tested. The lower end of the rod is releasably gripped by a removable clamp 35 terminating in a lower hook 36. The hook is adapted to hold a rod 37 secured to the sides of a cylindrical vessel or cup 38.

The clamp 35 may be freely removed from the lower end of wire R by turning screw 40 in a direction to separate the sides of the clamp.

Normally, spring 28 holds the rod 26 in uppermost position with contact points 31 open. When the clamp 35 and cup 38 are applied to the lower end of the wire R, the weight of the clamp and cup on the wire R and rod 26 compresses spring 28 sufficiently to close contact points 31. This initial weight is indicated by pointer 16 of the scale unit.

Closing of contact points 31 controls the feeding of shot from reservoir 42 through pipe 43 to cup 38. The weight of the shot transferred to cup 38 constitutes the variable testing force applied to stretch wire R. Normally, the pipe 43 is closed by a slide valve 44 one end of which is connected for operation to a bell crank lever 45 having an armature portion 46 for coaction with a magnet 47. A spring 48 holds the armature away from the magnet when the latter is not energized and through the bell crank lever holds the valve 44 in closed position. When the magnet is energized, the bell crank lever is rocked counterclockwise to withdraw the valve 44 from the pipe passage and permit shot to flow from reservoir 42 to cup 38.

When the weight of the shot in cup 38 added to the initial weight of the cup and of clamp 35 ruptures wire R, the cup carrying the parts connected to it including the ruptured lower end of the wire falls on top of a shock-absorbing pad 48 fixed to the top of a horizontal plate 49 which is connected by vertical members 50 to the sub-platform 24. A plate 51 having an opening slightly larger than and surrounding the circumference of the cup is fixed to the members 50 to guide the fall of the cup. Since plate 49 is fixed to the sub-platform 24, the same weight is acting on the scale unit as prior to the rupture of the wire.

To indicate the elongation of the wire as it stretches under the applied load, the top of clamp 35 is contacted by a screw 53 threaded into arm 54 of the pointer 55 which scans chart 56. The pointer is balanced by weight 57 in a manner to lightly press on and follow movement of clamp 35. A bracket 58 secured to one of members 50 carries the pointer while the chart 56 is also fixed to the same member 50. Since both the chart and pointer are fixed to the same movable member 50, relative movement of the chart and pointer is dependent only on movement of clamp 35 which is in turn equal to the elongation of the wire and is not affected by the movement of rod 50 or any part of the weighing mechanism which measures the applied testing force.

To start the machine in operation, the operator applies the clamp 35 and cup 38 to the lower end of the wire. This closes the contact points 31. The operator then depresses start key 60 (Fig. 3) to close contacts 61. With contacts 60 and 31 closed, a circuit is completed as follows: From the + side of the current supply through contacts 61, normally closed contacts 62, contacts 31, and relay magnet 63 to the − side of the supply. Energization of magnet 63 attracts double relay contacts 64 and 65. Closing of contacts 65 forms a holding circuit for shunting out start key contacts 61 to permit the operator to release the key 60 without interrupting energization of magnet 63. The holding circuit is from the + side of the current supply, through contacts 65, wire 66, contacts 62 and 31, and through magnet 63 to the − side. Magnet 63 thus remains energized although contacts 61 open.

Closing of contacts 64 and 65 also results in energization of magnet 47 previously described as controlling valve 44 of the shot supply. The circuit for magnet 47 is from the + side of the current supply, through contacts 65, contacts 64, and magnet 47 to the − side.

Magnet 47 remains energized as long as contacts 62 and contacts 31 are closed. When wire R breaks under test, contacts 31 open, as previously explained, breaking the circuit through relay magnet 63 to open contacts 64 and 65 and break the circuit through magnet 47.

A stop key 68 is provided to open normally closed contacts 62 to break the circuit of relay magnet 63. In turn, deenergization of magnet 63 opens relay contacts 64 and 65 to open the circuit of magnet 47. By alternately pressing the start key 60 to cause energization of magnet 47 and then pressing stop key 68 to deenergize magnet 47, a fine manual control of the feed of shot from reservoir 42 to cup 38 may be provided.

It is understood that the weight of the platform, sub-platform 24, auxiliary support 49, rods 50, the indicator gauge, the rod 26 and upper clamp 34 is initially neutralized by hanging appropriate counterweights 19 from beam 17 and by adjustment of the poise 18 along the beam. The weight of the wire under test is also neutralized by adjustment of the poise.

A brief summary of operations follows: The clamp 35 is secured to the lower end of the wire R to be tested. From clamp 35 is hung the cup 38. When the clamp 35 and cup 38 are thus applied to the wire, their weight is sufficient to compress spring 28 the amount necessary to close contacts 31. The operator now depresses start key 60 closing a circuit through relay magnet 63 which causes contacts 64 and 65 to close and form a holding circuit by-passing the start key contacts 61 and to simultaneously complete a circuit through magnet 47. The latter thereupon rocks bell crank lever 46 counterclockwise to open valve 44 and permit shot to flow from reservoir 42 to cup 38.

The weight of the shot, the cup, and the clamp 35 constitutes the testing force which acting through sub-platform 24 and platform 12 causes the base lever system to swing the pointer 16 along the weight indicating dial 160 and against resistance of the pendulum 15. When the wire breaks, the contacts 31 open and magnets 63 and 47 are deenergized. Deenergization of magnet 47 causes valve 44 to close and stop the flow of shot.

In manually controlling the flow of shot to cup 38, the operator alternately depresses start key 60 and stop key 68. He may then read the position of pointer 26 on weight dial 160 to note intermediate applied testing forces and in conjunction therewith note the elongation of the wire by reading the position of pointer 55 along dial 56. Breaking of the wire opens the magnet circuits and stops feed of further shot even though the start button is held down.

While the invention has been disclosed in connection with the embodiment shown in the drawing, it is understood that those skilled in the art may make changes, variations, and modifications without departing from the invention. I therefore wish to be limited only by the claims and the objects of invention. I claim:

1. In a machine for testing a length of material; force indicating and resisting mechanism, a device for connecting one end of the length of material under test to said mechanism, means for applying a variable testing force to the other end of the length of material, said force being transmitted through the material to said mechanism to be indicated thereby, and means connected to said mechanism for movement proportional to the magnitude of the applied force, and arranged to be acted on by the force applying means after the material breaks, for automatically receiving and transmitting the applied force to the mechanism to provide an indication of the applied force after the material breaks.

2. In a machine for testing a length of material; force measuring and resisting mechanism, a device for connecting one end of a length of material under test to said mechanism, a variable testing weight for applying a testing force to the other end of said length of material to stress the material, the testing force being transmitted through the length of material to said mechanism to be measured thereby, and a receiver underlying said weight to receive the weight after the material breaks and connected to the mechanism to transmit the force of the weight to the mechanism to be measured thereby after breaking of the material.

3. In a machine for testing a length of material for tension; force measuring and resisting mechanism, a clamp for connecting one end of a length of material under test to the mechanism, a weight holder connected to the other end of the length of material to receive weights for stretching the length of material, the force of said weights being transmitted through the length of material to said mechanism to be measured thereby a platform underlying the weight holder to receive the holder and the testing weights carried thereby after the material breaks and connected to said mechanism to transmit the force of the weights to the mechanism to be measured thereby after the material breaks.

4. In a machine for tension testing a length of material; force measuring and resisting mechanism, a clamp for connecting the upper end of a length of material under test to the mechanism, a clamp connected to the lower end of the length of material, a weight carried by the clamp for applying a stretching force to the material which force is transmitted through the material to said mechanism to be measured thereby, a platform underlying the weight for receiving the weight after the material breaks under the test, and means for suspending the platform from said mechanism to connect the platform to the mechanism for transmitting the load of the testing weight to the mechanism to be measured thereby after breaking of the material.

5. In a testing machine; variable force counterbalancing and force indicating mechanism, means for applying an initial force to an object to test the strength of the object, additional force applying means cooperating with the initial force applying means to exert additional force on the object, yieldable means for transmitting the applied forces to the aforesaid mechanism to be measured thereby, and a device controlled by the yielding of the latter means upon application of the initial force to the object to render the additional force applying means effective for operation.

6. In a testing machine; means for supporting an object to be tested, a weight holder applied to the object to exert the force of its own weight thereon, means for applying additional weights to the holder to exert additional force on the object, and a device controlled by application of the initial force to the object to render the additional weight applying means effective for operation.

7. In a testing machine, force measuring mechanism, a support for an object to be tested, force transmitting connections between the object support and the mechanism including a yieldable connection, means for applying testing forces to the object, which forces are transmitted through the object and said connections to the mechanism to be measured thereby, a control means operated by the yielding connection upon yielding thereof under an initial force applied to the object, and means rendered effective by the control means upon aforesaid operation thereof for causing the force applying means to apply additional testing forces to the object.

8. In a testing machine for tension testing a length of material; the combination of force measuring and resisting mechanism, a clamp for gripping one end of the length of material under test, force transmitting connections between said clamp and said mechanism including a yieldable connection, a weight receiver arranged for releasable connection with the other end of the length of material under test and upon its connection to the said material applying force through said material to effect yielding of the yieldable connections, means for applying weights to the receiver to increase the testing force on the material, and a control for the latter means operated by the yieldable connection upon aforesaid yielding thereof.

9. In a testing machine; a movable support for an object to be tested, means for applying an initial test force and additional test forces to the object, and a control operated by movement of the support upon application of the initial force to render the force applying means effective to apply additional testing forces and operable by movement of the support upon the breaking of the object under test for preventing further operation of the force applying means.

10. In a testing machine; a support for one end of an object to be tested, a receiver detachably connected to the opposite end of the object, a weight reservoir for feeding material into the receiver to stress the object according to the weight of the material in the receiver, a valve for controlling the flow of material from the reservoir into the receiver, a control for governing opening of the valve, and a device operated by application of the receiver to the object for causing the aforesaid control to open the valve.

11. In a testing machine; a support for an object to be tested, means for applying test forces to the object including a weight receiver, means detachably connecting the receiver to the object to stress the latter under the influence of the weight exerted by the receiver, a shot supply reservoir for feeding shot into the receiver to apply additional force to the object, a device controlled by application of the weight of the receiver to the object for causing the shot to feed from the reservoir into the receiver and for automatically cutting off the feed of the shot from the reservoir to the receiver upon the breaking of the object under test.

12. In a testing machine, a yielding support for an object to be tested, a receiver connected to the object, means for feeding material to the receiver to stress the object under the weight of the material fed into the receiver, a valve for controlling the feed of material, a magnet for controlling the valve, a circuit for energizing the magnet, and a switch for controlling the circuit operated by the yielding support upon yielding thereof under force applied to the object.

13. In a testing machine, a support for an object under test, a receiver connected to the object, means for supplying weight to the receiver to exert a testing force on the object, an electrical control for the weight supplying means, a circuit for operating said control including a starting switch closed for initiating operation of the circuit, and a second switch controlled by the circuit upon its initiation for shunting the starting switch and maintaining the circuit operative through said second switch.

14. In a machine such as described in claim 13, and an interrupting switch in said circuit operation of which opens the circuit to cause the electrical control to interrupt the supply of weight by said weight supplying means.

15. In a testing machine, a support for an object under test, a receiver connected to the object, means for supplying weight to the receiver to exert a testing force on the object, an electrical control for the weight supplying means, automatic means for causing the control to be continuously and automatically operative, and means for interrupting the operation of the automatic means to place the electrical control under manual regulation.

16. In a machine for testing material; force indicating and resisting mechanism including a part movable in proportion to the magnitude of an applied force, means for applying variable testing forces to a piece of material, means for transmitting the testing forces to the aforesaid mechanism to be measured thereby continuously during the testing operation, and means, additional to the first-named transmitting means, connected to said part of aforesaid mechanism for movement corresponding to movement of said part and arranged to be automatically acted on by the force applying means after the material breaks for automatically receiving the applied testing force and transmitting it to the mechanism to thereby cause the mechanism to continue indication of the applied, breaking, force after the material breaks.

17. In a machine for testing material; variable force counterbalancing and force indicating mechanism including a platform movable proportionally to the magnitude of an applied force, means to apply variable testing forces to a piece of material, means transmitting the testing forces to the mechanism to be automatically measured thereby continuously during the testing operation, and means, additional to the first-named transmitting means rigidly connected to the platform for movement therewith and arranged to automatically receive the applied force and transmit it to the mechanism through said platform upon the breaking of the material under test to thereby cause the mechanism to continue indication of the breaking force.

18. In a testing machine, a yielding support for an object to be tested, means for applying testing forces to the object to react, through said object, on the support for causing yielding of the latter, a control means operated by the yieldable suport upon yielding thereof, and means rendered effected by the aforesaid operation of the control means for causing the force applying means to apply an additional testing force to the object.

MATTHEW T. THORSSON.